United States Patent
Fertl et al.

(10) Patent No.: US 9,323,414 B2
(45) Date of Patent: Apr. 26, 2016

(54) METHOD FOR CONTROLLING A DEVICE

(75) Inventors: Daniela Fertl, Moosburg (DE); Fritjof Kaiser, Neubiberg (DE); Johanna Kollmann, Laarkirchen (AT); Florian Murr, München (DE); Anke Richter, München (DE); Astrid Tarkus, Graz (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1072 days.

(21) Appl. No.: 11/795,797

(22) PCT Filed: Jan. 16, 2006

(86) PCT No.: PCT/EP2006/050221
§ 371 (c)(1),
(2), (4) Date: May 30, 2008

(87) PCT Pub. No.: WO2006/077205
PCT Pub. Date: Jul. 27, 2006

(65) Prior Publication Data
US 2008/0276198 A1 Nov. 6, 2008

(30) Foreign Application Priority Data

Jan. 21, 2005 (DE) .......................... 10 2005 002 988
Jan. 26, 2005 (DE) .......................... 10 2005 003 680

(51) Int. Cl.
*G06F 3/0481* (2013.01)
*G06F 3/0482* (2013.01)

(52) U.S. Cl.
CPC ............ *G06F 3/0481* (2013.01); *G06F 3/0482* (2013.01)

(58) Field of Classification Search
CPC ................................................... G06F 3/0482

USPC ......... 715/843, 737, 841, 853, 864, 810, 777, 715/771, 970, 793, 792, 796, 778, 766, 797
See application file for complete search history.

(56) References Cited

U.S. PATENT DOCUMENTS 5,086,385 A * 2/1992 Launey et al. .................. 700/83
5,589,892 A   12/1996 Knee et al.
(Continued)

FOREIGN PATENT DOCUMENTS

CN   1397033 A        2/2003
DE   103 22 023 A1   12/2004
(Continued)

OTHER PUBLICATIONS

International Search Report for Application No. PCT/EP2006/050221; mailed Jul. 7, 2006.
(Continued)

*Primary Examiner* — Nicholas Ulrich
(74) *Attorney, Agent, or Firm* — Staas & Halsey LLP

(57) ABSTRACT

A device with a graphical user interface, via which the functions of the device are controlled has functions divided into categories which are sub-divided into subcategories. The categories are represented by primary regions that are schematically arranged on the user interface. The primary regions contain elements, each of which represents a sub-category of the category of the respective primary region. In addition, only one primary region is expanded by the display of a secondary region after an element has been selected. The secondary region contains control elements for at least one function that is assigned to the sub-category representing the selected element. The at least one function is controlled by the control elements.

13 Claims, 2 Drawing Sheets

(56) References Cited

U.S. PATENT DOCUMENTS

| | | | |
|---|---|---|---|
| 5,621,662 A * | 4/1997 | Humphries et al. | 700/276 |
| 5,644,737 A * | 7/1997 | Tuniman et al. | 715/810 |
| 5,808,610 A * | 9/1998 | Benson et al. | 715/788 |
| 5,896,133 A | 4/1999 | Lynch et al. | |
| 6,011,555 A * | 1/2000 | Eckhoff et al. | 715/843 |
| 6,020,881 A * | 2/2000 | Naughton et al. | 715/740 |
| 6,049,336 A * | 4/2000 | Liu et al. | 715/830 |
| 6,112,201 A | 8/2000 | Wical | |
| 6,182,094 B1 * | 1/2001 | Humpleman et al. | 715/234 |
| 6,396,517 B1 | 5/2002 | Beck et al. | |
| 6,448,987 B1 * | 9/2002 | Easty et al. | 715/834 |
| 6,480,889 B1 * | 11/2002 | Saito et al. | 709/220 |
| 6,580,442 B1 * | 6/2003 | Singh et al. | 715/840 |
| 6,680,730 B1 * | 1/2004 | Shields et al. | 345/169 |
| 6,765,597 B2 * | 7/2004 | Barksdale et al. | 715/853 |
| 6,844,807 B2 * | 1/2005 | Inoue et al. | 340/3.7 |
| 6,857,105 B1 * | 2/2005 | Fox et al. | 715/825 |
| 6,965,803 B2 * | 11/2005 | Bungert et al. | 700/83 |
| 7,017,122 B1 * | 3/2006 | Lee et al. | 715/812 |
| 7,020,694 B2 * | 3/2006 | Saito et al. | 709/220 |
| 7,036,092 B2 * | 4/2006 | Sloo et al. | 715/841 |
| 7,039,858 B2 * | 5/2006 | Humpleman et al. | 715/205 |
| 7,168,050 B1 * | 1/2007 | Kwon et al. | 715/843 |
| 7,216,303 B2 * | 5/2007 | Aggarwal et al. | 715/825 |
| 7,363,593 B1 * | 4/2008 | Loyens et al. | 715/853 |
| 7,379,778 B2 * | 5/2008 | Hayes et al. | 700/66 |
| 7,418,670 B2 * | 8/2008 | Goldsmith | 715/810 |
| 7,594,188 B2 * | 9/2009 | Rudolph et al. | 715/810 |
| 7,720,887 B2 * | 5/2010 | McCormack et al. | 707/805 |
| 8,707,212 B2 * | 4/2014 | Ogren | 715/841 |
| 2002/0080187 A1 * | 6/2002 | Lawton | 345/810 |
| 2002/0101450 A1 * | 8/2002 | Magendanz et al. | 345/764 |
| 2003/0122868 A1 * | 7/2003 | Aggarwal et al. | 345/760 |
| 2003/0132911 A1 | 7/2003 | Narioka et al. | |
| 2003/0197740 A1 * | 10/2003 | Reponen | 345/810 |
| 2005/0076309 A1 * | 4/2005 | Goldsmith | 715/811 |
| 2005/0177801 A1 * | 8/2005 | Vronay et al. | 715/828 |
| 2006/0020904 A1 * | 1/2006 | Aaltonen et al. | 715/850 |
| 2006/0095865 A1 * | 5/2006 | Rostom | 715/810 |
| 2007/0113199 A1 * | 5/2007 | Lausterer et al. | 715/810 |

FOREIGN PATENT DOCUMENTS

| | | |
|---|---|---|
| EP | 1 338 961 A2 | 8/2003 |
| EP | 1 462 918 A1 | 9/2004 |
| JP | 5-265682 | 10/1993 |
| WO | WO 03/104964 A2 | 12/2003 |

OTHER PUBLICATIONS

Office Action issued by the Japanese Patent Office on Sep. 27, 2011 in a related Japanese patent application.

* cited by examiner

METHOD FOR CONTROLLING A DEVICE

CROSS REFERENCE TO RELATED APPLICATIONS

This application is based on and hereby claims priority to German Application No. 10 2005 002 988.4 filed on Jan. 21, 2005 and German Application No. 10 2005 003 680.5 filed on Jan. 26, 2005, the contents of which are hereby incorporated by reference.

BACKGROUND

Described below is a method for controlling a device that includes a graphical user interface which is displayed on a screen of the device. Interaction with the user interface takes place as a rule by way of input devices which the device itself provides, such as a pen or keys.

One concept for the design of a user interface is demonstrated by the metaphor of a stack of filing cards. Such a stack is illustrated in FIG. 2. The user interface exhibits three cards 40 lying on top of one another, each of which can be fetched to the foreground by way of its tab 30. To enable the user to identify the individual cards, their tabs 30 are each provided with a tab label 20, 21 and 22.

This user interface metaphor offers the advantage that a large number of categories can be made available for selection by the user. The disadvantage in this case however is the high space requirement for the cards and tabs, as a result of which this concept can only be used poorly on small screens.

To summarize, it can be stated that small screens or user interfaces of devices can only be utilized inadequately when using the described concept. As a consequence, the user prompting needs to be distributed over a plurality of views and menus. This means there is not only a temporary loss of context but additional interactive steps are also required which delay and impede the user interaction.

SUMMARY

An aspect is therefore to set down a method for controlling a device, in which the content on the user interface is represented in a clearer and more compact fashion in order to facilitate interaction.

With regard to the method for controlling a device, the device has a user interface which serves to control the functions of the device. The functions are divided into categories and the categories are subdivided into subcategories. The categories are represented by the primary regions on the user interface, which are arranged in a schema. The primary regions contain elements which each represent a subcategory of the category of the respective primary region. Furthermore, only one primary region is ever expanded by a secondary region after an element has been selected, in which control elements are displayed for at least one function which is associated with the subcategory that represents the selected element. The function in question is controlled by way of the control elements.

The particular advantage of this solution lies in the fact that the space-saving representation of blinds is combined with the multilayer representation of filing cards. As a result, an extremely compact and clear representation is achieved for small user interfaces. Categories are represented by blinds—in the form of primary regions and, after opening it, an additional secondary region. These blinds are multilayer, in other words they include content in a plurality of subcategories. The elements in the primary regions which enable the display of the subcategories form, for example, a type of matrix which utilizes the image area in an efficient manner. Folders or menus for example can be selected as categories by way of the primary regions.

According to one embodiment, the device is a mobile terminal device.

With regard to the mobile terminal device, this can for example be a video mobile phone or a PDA. Mobile terminal devices particularly often have only small screens, for which reason only a small amount of space is available for the user interface. The method is therefore particularly well suited here for achieving a compact and clear display.

In one development, the primary regions are visualized as bars (50).

This offers the advantage that the schema according to which the primary regions are arranged can be chosen to be particularly compact, efficient and clear.

According to one development, the elements are icons. This development makes it possible to make available the subcategories of a blind in a space-saving and clear manner by an icon in the primary region.

In a special development, the opening of a blind is visualized by animation which pushes the remaining primary regions from the user interface.

The advantage of this development is on the one hand in a virtual extension of the user interface beyond the screen boundaries. On the other hand, the animation enables the user to intuitively comprehend the behavior of the blinds. Interaction is facilitated as a result.

In a special embodiment, the device forwards control commands to another system.

In this situation, the other system can be a house automation system. The categories are then associated with the rooms of a house and the subcategories with room properties. In this situation, the functions regulate the room properties.

This embodiment has the advantage that a large number of monitoring and control functions which need to be selected in the context of building control by way of a mobile terminal device can be displayed on the latter's screen in a space-saving and clear fashion. Also described below are means for executing the method.

BRIEF DESCRIPTION OF THE DRAWINGS

These and other objects and advantages will become more, apparent and more readily appreciated from the following description of the preferred embodiments, taken in conjunction with the accompanying drawings of which.

DETAILED DESCRIPTION OF THE PREFERRED EMBODIMENT

Figure 1:
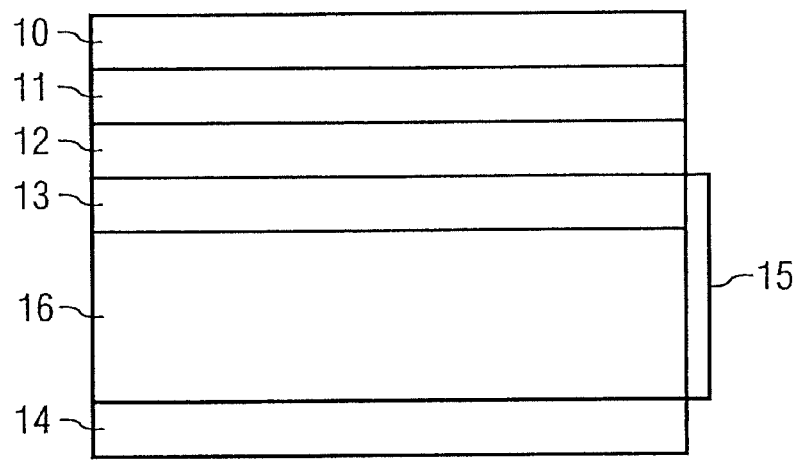
FIG. 1 shows a user interface according to a blind-based concept.
Figure 2:
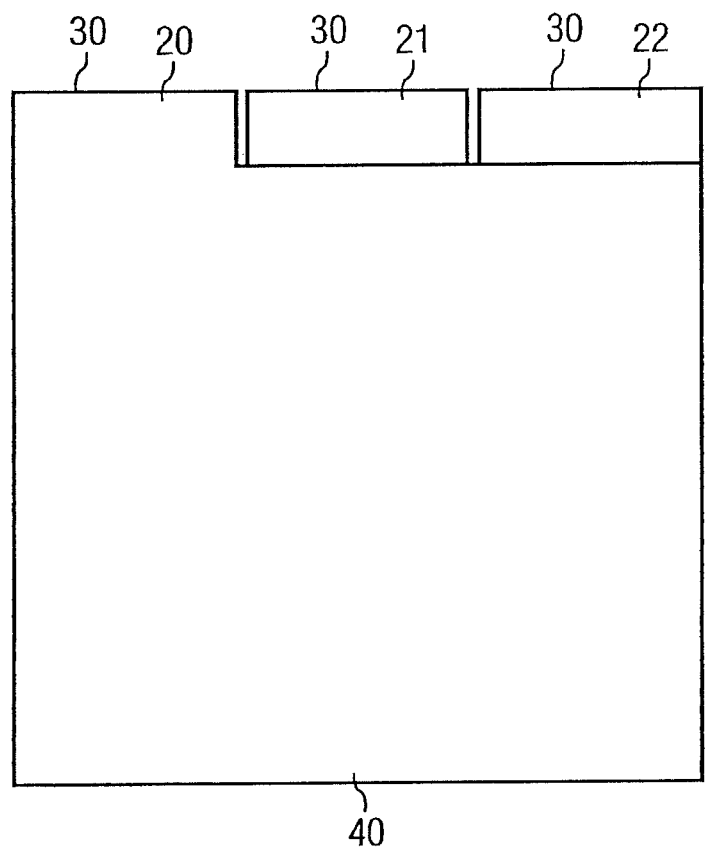
FIG. 2 shows a user interface with filing cards

Reference will now be made in detail to the preferred embodiments, examples of which are illustrated in the accompanying drawings, wherein like reference numerals refer to like elements throughout.

Differing concepts can be applied in order to display information in a clear and compact form on small user interfaces. With regard to a so-called blind-based concept, a number of bars are provided which are displayed arranged row by row on the user interface. FIG. 1 shows such a user interface. Bars 10, 11, 12, 13 and 14 are shown, each of which represents a category. By clicking on one of the bars, a user can open an associated blind 15. With regard to the case shown in FIG. 1, clicking on the bar 13 opens the blind 15 with a secondary region 16 in which content relating to the respective category is displayed. In this situation, only one blind can ever be open at a time. The position of the bars relative to one another remains unchanged in this case. Opening and closing of the blind 15 is effected very simply by clicking on the bar 13. Even when the blind 15 is opened, the other bars 10, 11, 12 and 14 remain visible.

On account of the high degree of clarity, this blind representation is particularly suitable for the small screens of mobile terminal devices. However, one disadvantageous aspect in this situation is the fact that the number of categories which can be displayed is severely limited by the number of bars.

Figure 3:
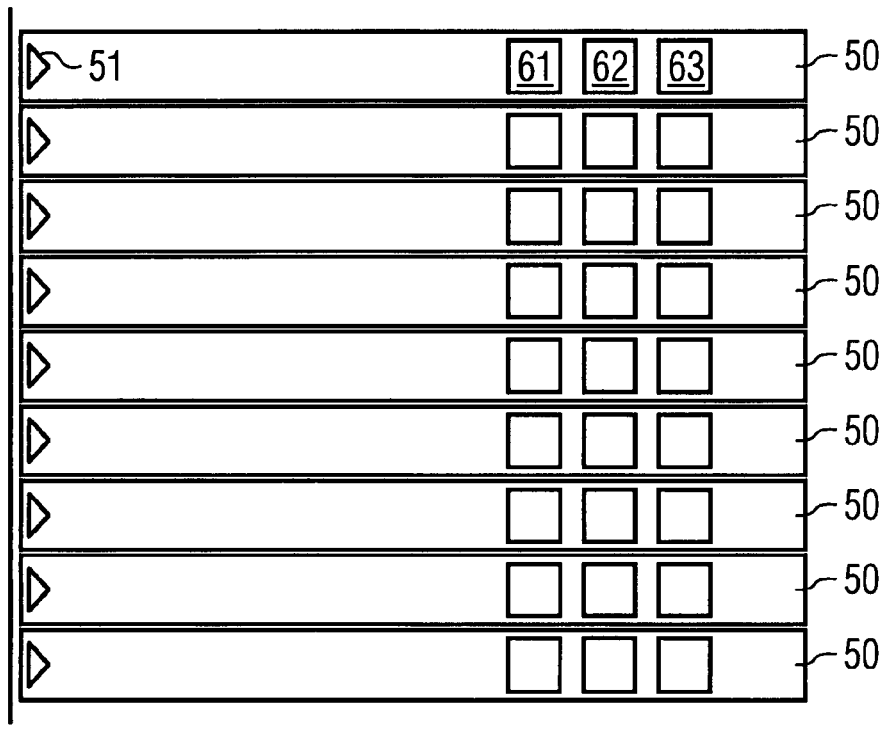
FIG. 3 shows a user interface with bars and elements which form a matrix-like structure.

FIG. 3 shows a user interface with a number of closed blinds, each of which is represented by a bar 50 and is arranged in a schema. Each bar 50, as a primary region, represents one blind. A category, in other words a grouping or class of content or functions, is associated with each blind or each bar 50 in this situation. With regard to a mobile phone, the categories in question could for example be an address book or other folders. The mobile phone provides functions within the scope of the address book such as changing an entry or calling the stored number.

Instead of using bars, the primary regions/blinds can also be visualized differently, for example as vertical columns in a language area in which characters are arranged vertically. The blind can then also open to the side, for example.

Figure 4:
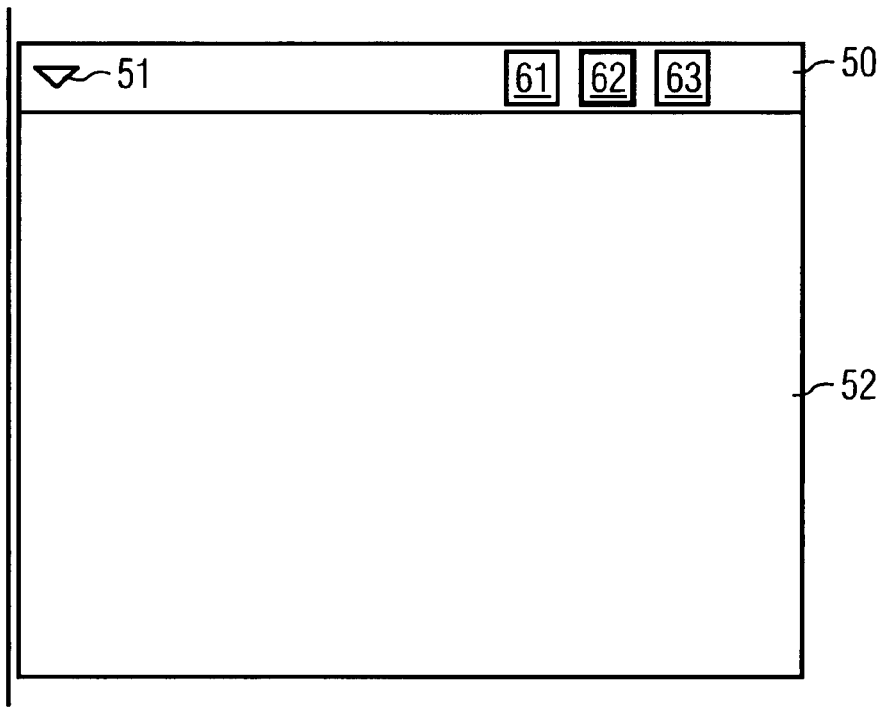
FIG. 4 shows an opened blind.

The bars 50 contain elements 61, 62 and 63. The number of three elements 61, 62 and 63 shown in FIG. 3 is purely random in this situation. Each of the elements 61, 62 and 63 represents a subcategory of the category which is represented by the bar 50, for example a subfolder of the address book. Different bars 50 can have the same but also different elements 61, 62, 63 in any number. Clicking one of the elements 61, 62 or 63 opens the blind associated with the bar 50, as shown in FIG. 4.

According to one embodiment, opening the blind causes the remaining bars 50 to disappear from the user interface. The contents of the blind are displayed in a secondary region 52. In this situation, the contents depend on the subcategory which has been predefined through the choice of one of the elements 61, 62 or 63. In FIG. 4 the element 62 has been chosen, which is shown highlighted in the illustration of the opened blind.

The blind can also be opened or closed by simply clicking in the bar 50 or by double-clicking in the bar 50 respectively. Furthermore, the blind can also be opened or closed by simply clicking on an element 51 which is implemented as an arrow in FIG. 3 and FIG. 4. In this situation, the changed state of the arrow 51 in FIG. 4 additionally illustrates that the blind has been opened. Any other icon may also be, used for this purpose.

Each of the categories associated with the individual bars 50 can be denoted by text which then appears as a title in the respective bar 50. The associated blind can then be opened by clicking on the respective text.

The elements 61, 62 and 63 can for example be implemented as icons. This holds the special advantage that the respective subcategory can be provided in a space-saving manner on the bar 50 for selection and can be intuitively understood by the user through its icon. In this situation, a click on the arrow 51 or on the text in the bar 50 can be associated with the display of the same subcategory which was displayed by clicking on the first element 61. The elements 61, 62 and 63 can however also be represented for example by keywords or tabs.

In a development, the opening of a blind is accompanied by a dynamic animation. In this situation, the remaining bars 50 are pushed upwards and/or downwards out of the whole area of the user interface or a partial region of the user interface reserved for this purpose. As a result the user receives an intuitive response relating to his interaction.

Even when the blind is open, the user continues to have access to all the subcategories of this blind because he can continue to click on the elements 61, 62 and 63, as shown in FIG. 4.

The animation results in a virtual extension of the screen upwards and downwards. As a result, the user interface becomes more self-explanatory for the user and makes interaction more of a pleasure.

The matrix-like structure of bars and elements shown in FIG. 3 permits intuitive and fast navigation and selection of their contents. This is advantageous particularly in the case of the small screens of mobile terminal devices because this compact and clear representation renders superfluous any unnecessary interaction steps and switches of views and menus.

In one concrete application, the user interface is used for building control and building monitoring within the scope of house automation. This takes place as a rule with the aid of mobile terminal devices, on which a large quantity of building data and a large number of building functions need to be visualized for the user, and to be capable of being controlled. The matrix-like representation from FIG. 3 is particularly suitable here. Individual rooms of the building, for example, can be associated as categories with the bars 50. Typical functions associated with a room, such as air temperature, lighting or ventilation, can then in turn be chosen as elements 61, 62 and 63. All the information required for monitoring and control purposes can then be displayed in the secondary region 52 according to FIG. 4. In this manner, the user has compact and clear access to all the required rooms and control options. The mobile terminal device thus captures the control commands from the user and forwards these to the house automation system.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for controlling a device having a user interface by which functions of the device are controlled, comprising:
    dividing the functions into categories and the categories into subcategories;
    representing the categories by primary regions on the user interface, the primary regions arranged in a schema and physically containing elements which each represent a subcategory of a category of one of the primary regions;
    responding to a selection of an element by expanding only one primary region by displaying a secondary region, such that the one primary region is physically expanded by the secondary region, the secondary region being a region in which control elements are displayed for at least one function which is associated with an associated subcategory that is represented by the element selected, wherein an entire display area of the one primary region and all the elements contained in the primary region remain displayed when the one primary region is physically expanded by the secondary region and displaying the secondary region includes using an animation that pushes remaining primary regions from the user interface; and controlling the at least one function by way of the control elements.

2. The method as claimed in claim 1, wherein the device is a mobile terminal device.

3. The method as claimed in claim 1, wherein the device forwards control commands to another system.

4. The method as claimed in claim 3,
wherein the another system is a house automation system,
wherein the categories are associated with rooms of a house,
wherein the subcategories are associated with room properties, and
wherein the functions regulate the room properties.

5. The method as claimed in claim 1, wherein the primary regions are displayed as bars.

6. The method as claimed in claim 1, wherein the elements are icons.

7. The method as claimed in claim 1, wherein the elements that each represent a subcategory of a category of one of the primary regions are displayed within the respective primary region.

8. The method as claimed in claim 1, wherein, when a primary region is expanded by a secondary region, the expanded primary region is expanded by the secondary region in correspondence with the schema.

9. The method as claimed in claim 1, wherein, in addition to being physically expanded by the secondary region in response to selection of an element, the one primary region is physically expanded by the secondary region in response to selecting any portion of the one primary region.

10. The method as claimed in claim 9, wherein, when the one primary region is physically expanded by the secondary region in response to selecting a portion of the one primary region that does not contain any of the elements, the secondary region displays control elements associated with an associated subcategory that is represented by a first element from among the elements contained in the one primary region.

11. A device having a user interface by which functions of the device are controlled, comprising:
one or more processors configured to:
divide the functions into categories and the categories into subcategories;
represent the categories by primary regions on the user interface, the primary regions arranged in a schema and physically containing elements which each represent a subcategory of a category of one of the primary regions;
respond to a selection of an element by expanding only one primary region by a secondary region, such that the one primary region is physically expanded by the secondary region, the secondary region being a region in which control elements are displayed for at least one function which is associated with an associated subcategory that is represented by the element selected, wherein an entire display area of the one primary region and all the elements contained in the primary region remain displayed when the one primary region is physically expanded by the secondary region and displaying the secondary region includes using an animation that pushes remaining primary regions from the user interface; and
control the at least one function by way of the control elements.

12. The device as claimed in claim 11, wherein the elements that each represent a subcategory of a category of one of the primary regions are displayed within the respective primary region.

13. The device as claimed in claim 11, wherein, when a primary region is expanded by a secondary region, the expanded primary region is expanded by the secondary region in correspondence with the schema.

* * * * *